Dec. 16, 1924.
F. J. YOUNG
CASING HOOK
Filed Oct. 27, 1923
1,519,430
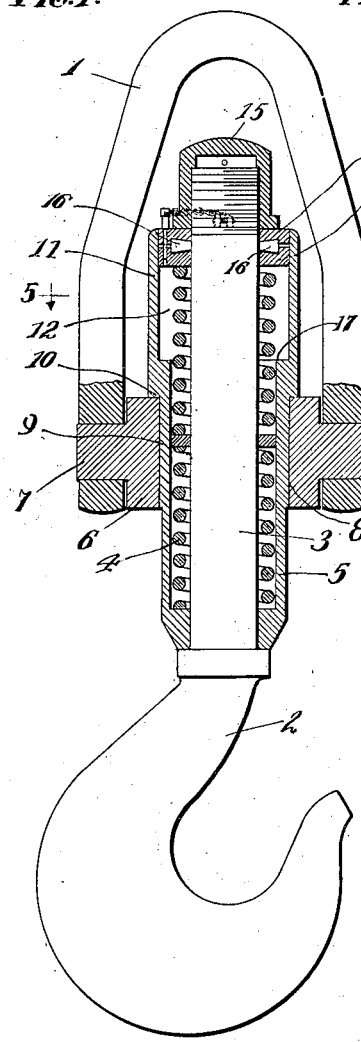
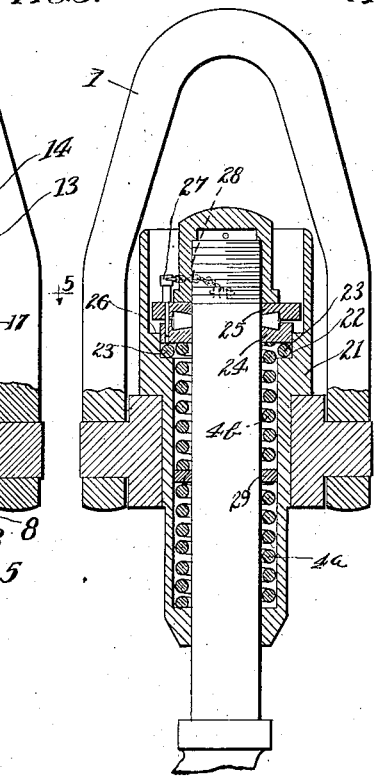
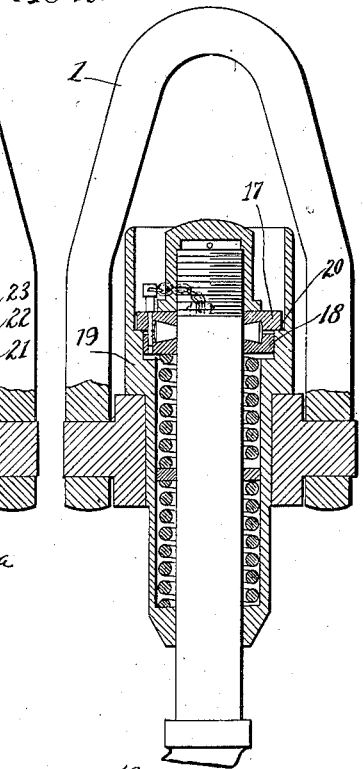
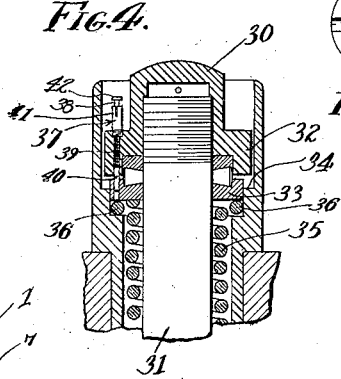
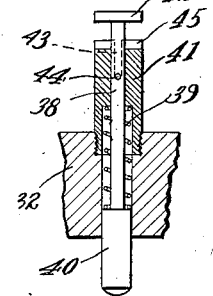
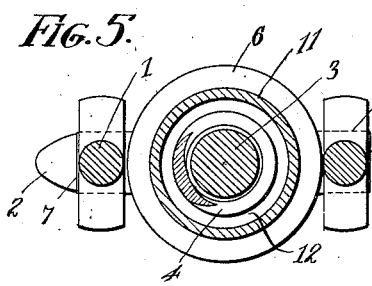
Inventor
FORREST J. YOUNG
By Lyon & Lyon
Attorneys Patented Dec. 16, 1924.

1,519,430

UNITED STATES PATENT OFFICE.

FORREST J. YOUNG, OF TORRANCE, CALIFORNIA, ASSIGNOR TO UNION TOOL COMPANY, OF TORRANCE, CALIFORNIA, A CORPORATION OF CALIFORNIA.

CASING HOOK.

Application filed October 27, 1923. Serial No. 671,194.

*To all whom it may concern:*

Be it known that I, FORREST J. YOUNG, a citizen of the United States, residing at Torrance, in the county of Los Angeles and State of California, have invented a new and useful Casing Hook, of which the following is a specification.

This invention relates to casing hooks such as used in drilling deep wells, and particularly to the type of casing hook which employs a spring in its construction, to support the weight of the casing carried by the hook. The springs of casing hooks of this type are frequently broken. Furthermore, as now constructed, these hooks are mounted to rotate on a horizontal axis on the supporting yoke and the center of gravity of the hook and its associated parts are so located that the hook does not hang freely in a vertical position. It is also possible for a foreign body to find its way into the space between the coils of the spring tending to break the spring or interfere with its operation. This follows because, as usually constructed the coils of the spring are exposed and for this reason it is also possible for a workman to have his fingers caught and injured by the coils of the spring. These hooks are usually mounted on a swivel bearing. The weight of the casing supported on this swivel is sometimes very great so that if a roller bearing is employed the rollers are subjected to great forces.

The general object of this invention is to provide a hook of this type of simple construction, operating in such a way that there is a limit to the force to which the spring can be subjected; also to provide a hook of this type constructed in such a way that a spring of increased length can be employed without increasing the overall length of the casing hook, and to mount the spring so that its coils are not exposed. A further object of the invention is to provide such a hook with a swivel bearing having means for limiting the forces which must be sustained by the bearing; and to provide simple means controlled at will for supporting the weight of the hook so as to relieve the bearing of pressure, or in such a way as to take all the weight on the swivel bearing. A further object of the invention is to provide simple means for locking the parts of the bearing together, at will, to prevent free rotation of the hook.

Further objects of the invention will appear hereinafter.

The invention consists in the novel parts and combination of parts to be described hereinafter, all of which contribute to produce an efficient casing hook.

A preferred embodiment of the invention is described in the following specification while the broad scope of the invention is pointed out in the appended claims.

In the drawings:

Figure 1 is a side elevation and partial vertical section taken through a hook embodying my invention.

Fig. 2 is a view similar to Fig. 1 with the lower portion of the hook broken away, and illustrating another embodiment of the invention in which, after a certain amount of distortion of the spring has taken place, no further distortion can occur, and at the same time, the swivel bearing is relieved of a large portion of the weight on the hook.

Fig. 3 is a view similar to Fig. 2, and illustrating the use of means which I may employ, at will, to enable the bearing to continue to sustain all the weight even after the distortion of the spring has reached its desired limit.

Fig. 4 is a vertical section taken at the upper end of the shank of the hook and showing an embodiment of the invention in which the upper bearing member is formed as a part of a nut secured to the hook.

Fig. 5 is a cross section taken through the hook on the line 5—5 of Fig. 1,

Fig. 6 is a vertical section illustrating a type of locking pin for the swivel bearing which is shown in Fig. 4, and Fig. 7 is a cross section upon an enlarged scale taken through the pin shown in Fig. 6, just below the head.

In practising my invention I provide means such as a yoke for supporting the hook, and I prefer to support the same on a swivel bearing which is in turn supported on a spring. The swivel bearing includes two cooperating bearing members, and I provide means for limiting the movement of one of the bearing members when the spring is distorted under the action of the load, operating to prevent further distortion of the spring and limiting the pressure upon the bearing. However, I construct the device in such a way that if desired it can be made to operate so that, at will, the entire load may be taken upon the bearing, although there is a limit to the amount of distortion which can take place in the spring. I also construct the casing hook in such a way that the location of the spring seat with reference to the supporting yoke, is lowered, and in this way I lower the center of gravity of the hook with respect to the horizontal axis on which the hook swings. This operates to insure that the hook will always hang freely in a vertical position.

In order to accomplish this I provide means such as a yoke 1 for supporting the hook 2, said hook having a shank 3 which extends upwardly and is supported by the yoke 1 through the agency of a spring 4. This spring is supported and guided through a spring barrel 5 which is carried in a cross-head 6 provided with trunnions 7 received in the forks of the yoke, and enable the hook to rock on a horizontal axis.

The central portion of the cross-head is formed with a center bore 8 which receives a tubular neck 9 on the barrel 5 which fits into it.

The upper portion of the barrel 5 is formed with an annular shoulder 10 which rests on the upper face of the cross-head to support the barrel. The spring 4 is enveloped by the barrel and the upper end of the barrel is enlarged into a head 11 of increased diameter which carries a counterbore or chamber 12. The spring 4 has its seat at the lower end of the barrel and extends up into this chamber 12, and supports the hook by thrusting upwardly against a collar 13, loose on the shank 3 and which constitutes the lower member of a swivel bearing, the upper member of which is in the form of a collar 14, fixed against longitudinal movement upwardly on the shank 3 by reason of the fact that its upper face seats against a nut 15 which is screwed onto threads at the upper end of the shank. Between the collars 13 and 14 a race-way may be formed for rollers or bearing cones 16. At the lower end of the chamber 12 an annular shoulder 17 is formed.

With a hook embodying the features of my invention as described, and as exemplified in Fig. 1, it will be evident that when a sufficient load is placed on the hook 2 the spring 4 will be compressed and the collar will eventually seat upon the annular shoulder 17. This will prevent any further distortion taking place in the spring and the entire weight of the load will then be supported on the swivel bearing.

As illustrated in Fig. 2, the bearing members are represented as so constructed that when the distortion of the spring is sufficient, no further distortion of the spring will take place, but the weight of the hook will not be supported upon the swivel bearing, but instead, will be supported on the upper bearing member directly. In order to accomplish this I construct the casing hook in such a way that as the shank descends to a certain point the upper bearing member will be held against any further downward movement; in other words, I limit the downward movement of the upper bearing member.

This effect may be very simply attained by forming an upper bearing member or collar 17 (see Fig. 2) so that it projects outwardly beyond the periphery of the lower bearing member or collar 18. I provide the upper end of the spring barrel 19 with a supplementary annular shoulder 20 which will permit the collar 18 to pass down but which will engage the edge of the upper collar 17. With this organization of parts it will be evident that when the collar 17 rests upon the shoulder 20 no further distortion of the spring can take place, and the weight on the hook will not be supported through the bearing but directly by the barrel 19; of course, the spring is still subjected to the load which compressed it but the amount of this load is, of course, limited.

I prefer to construct the casing hook, however, in such a way that if desired, the weight can be supported through the swivel bearing even after the distortion limit of the spring has been reached. In order to accomplish this I provide the barrel 21 (see Fig. 3) with removable means to engage the lower collar. In the present instance, I provide two transversely drilled openings 22 and in each of these holes 22 I mount a removable pin 23. When these pins 23 are in position they will be engaged by the under side of the lower member or collar 24 of the swivel bearing, and this engagement will take place before the upper collar 25 engages the annular shoulder 26 which corresponds to the annular shoulder 20 shown in Fig. 2. Hence, when the pins 22 and 23 are employed the amount of distortion of the spring is limited but the weight of the load will nevertheless be supported on the swivel bearing.

I provide any suitable means for preventing operation of the swivel bearing, at will, and this is in the form of a removable pin 27 which is attached by a chain 28. This pin may be passed downwardly from above through two aligning openings in the edges of the collars 24 and 25. (See Fig. 3.)

The spring 4 is preferably not constructed in one entire piece but is formed in two sections 4ª and 4ᵇ (see Fig. 3) which are separated by a washer 29. This washer is in the lower parts of the barrel. If a coil breaks, it will not make it necessary to reconstruct the spring, as another spring section can be immediately substituted.

Instead of constructing the upper bearing member as a collar distinct from the nut I may construct these parts so that the nut 30 which screws on to the upper end of the shank 31 is provided with a downwardly projecting rim or skirt 32 which projects beyond the edge of the lower bearing member or collar 38, (see Fig. 4), so that it may engage an annular shoulder 34 formed on the upper end of the barrel and corresponding to the annular shoulders 20 and 26 already described. As illustrated in Fig. 4, the parts are represented with the spring 35 at the limit of its distortion and the weight is being taken on removable pins 36 corresponding to the pins 23 already described. When these pins 36 are removed, however, the lower end of the skirt 32 will come against the shoulder 34 so that the load acting upon the swivel bearing will be relieved.

In Fig. 4 I have illustrated a type of locking pin 37 which is controlled by a spring tending to project the pin down into its locking position. The pin, however, may be pulled up at will and locked in a withdrawn position.

The construction of this spring pin is illustrated clearly in Figs. 6 and 7. The lower portion or head of the pin is guided vertically in the skirt 32 of the nut 30, and the upper portion of the pin is in the form of a stem 38 around which a coil spring 39 is placed which thrusts downwardly against the enlarged head 40. The upper end of the stem 38 passes through and beyond a guide plug 41 and carries a thumb head 42. The upper end of the guide 41 is provided with a vertical diametrically disposed slot 43 which receives a cross pin 44 carried by the stem 38. By pulling the stem 38 upwardly this cross pin 44 may be brought out of the slot 43, and the stem may then be rotated on its axis so as to let the cross pin rest in a transverse groove 45 cut in the upper face of the guide. In this way the pin may be locked with its head 40 withdrawn into the skirt.

It is understood that the embodiment of the invention described herein is only one of the many embodiments this invention may take and I do not wish to be limited in the practice of my invention nor in my claims to the particular embodiment set forth.

I claim:

1. In a casing hook, in combination, a yoke, a spring supported thereby, a hook having a swivel bearing supported on the spring and including two cooperating bearing members, and means engaging the upper of said members for limiting the movement thereof when the spring is distorted under the action of the load, operating to prevent further distortion of the spring and limit the pressure upon the bearing.

2. In a casing hook, in combination, a yoke, a spring supported thereby, a hook having a swivel bearing supported on the spring and including an upper bearing member carried by the hook and a lower bearing member receiving the thrust of the spring, and means for engaging the upper bearing member when the spring is distorted under the action of the load, operating to prevent further distortion of the spring and limit the pressure upon the bearing.

3. In a casing hook, in combination, a yoke, a spring supported thereby, a hook having a swivel bearing supported on the spring and including an upper bearing member carried by the hook and a lower bearing member receiving the thrust of the spring, means for engaging the upper bearing member to limit its movement when the spring is distorted under the action of the load, operating to prevent further distortion of the spring and limit the pressure upon the bearing, and means for locking the bearing members against rotation with respect to each other.

4. In a casing hook, in combination, a yoke, a spring supported thereby, a hook having a swivel bearing supported on the spring and including an upper bearing member carried by the hook and a lower bearing member receiving the thrust of the spring, and a spring barrel receiving the spring and having means engaging the upper bearing member when the spring is distorted under the action of the load, operating to prevent further distortion of the spring and limit the pressure upon the bearing.

5. In a casing hook, in combination, a yoke, a spring supported thereby, a hook having a swivel bearing supported on the spring and including a lower bearing member and an upper bearing member projecting downwardly beyond the lower bearing member, the lower bearing member receiving the thrust of the spring, and means for engaging the upper bearing member for limiting the movement thereof when the spring is distorted under the action of the load, operating to prevent further distortion of the spring and to relieve the bearing from a portion of the load carried by the hook.

6. In a casing hook, in combination, a yoke, a spring supported thereby, a hook having a swivel bearing supported on the spring and including a lower bearing member and an upper bearing member projecting downwardly beyond the lower bearing member, the lower bearing member receiving the thrust of the spring, means for engaging the upper bearing member for limiting the movement thereof when the spring is distorted under the action of the load, operating to prevent further distortion of the spring and to relieve the bearing from a portion of the load carried by the hook, and removable means for limiting the movement of the lower bearing member instead of the upper bearing member, operating to prevent further distortion of the spring but leaving the entire load supported on the swivel bearing.

7. In a casing hook, in combination, a yoke, a cross-head supported on the yoke and having a spring seat located below the yoke, a spring supported below the yoke on the spring seat, and a hook supported on the spring.

8. In a casing hook, in combination, a yoke, a cross-head pivotally supported on the yoke and having a retaining sleeve providing a spring seat located below the pivotal supports of the yoke, a spring supported on the spring seat in the retaining sleeve, and a hook supported on the spring.

9. In a casing hook, in combination, a yoke, a cross-head supported thereby, a spring barrel supported in the cross-head and extending below the same, a hook having a shank guided to slide through the barrel, a coil spring surrounding the shank seating in the barrel below the cross head, a swivel bearing enclosed by the barrel for supporting the hook and having a loose collar on the shank receiving the upward thrust of the spring and an upper fixed collar carried by the shank and supported on the loose collar, said barrel having a shoulder to engage the fixed collar and limit the distortion of the spring under the action of the load on the hook.

10. In a casing hook, in combination, a yoke, a cross-head supported thereby, a spring barrel supported in the cross-head and extending below the same, a hook having a shank guided to slide through the barrel, a coil spring surrounding the shank, seating in the lower end of the barrel a swivel bearing for supporting the hook including a loose collar on the shank receiving the upward thrust of the spring, and an upper fixed collar in the form of a nut carried by the shank and supported on the loose collar, said barrel having a shoulder to engage the fixed collar and limit the distortion of the spring under the action of the load on the hook, a removable pin carried by the barrel for engaging the lower collar when in place, operating to limit the distortion of the spring but operating to carry all of the load on the bearing.

Signed at Torrance, Cal., this 15th day of October, 1923.

FORREST J. YOUNG.